(12) United States Patent
O'Brien et al.

(10) Patent No.: US 9,064,539 B1
(45) Date of Patent: Jun. 23, 2015

(54) SYSTEMS AND METHODS FOR TIMING CONTROL IN A DATA PROCESSING SYSTEM

(71) Applicant: Avago Technologies General IP (Singapore) Pte. Ltd.

(72) Inventors: Scott M. O'Brien, Eden Prairie, MN (US); Jason P. Brenden, Woodbury, MN (US); Cameron C. Rabe, Inver Grove Heights, MN (US); Peter J. Windler, Fort Collins, CO (US); Joseph D. Stenger, Woodbury, MN (US); David W. Kelly, Eagan, MN (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/505,260

(22) Filed: Oct. 2, 2014

(51) Int. Cl.
*G11B 5/09* (2006.01)
*G11B 5/02* (2006.01)
*G11B 20/10* (2006.01)

(52) U.S. Cl.
CPC .................... *G11B 20/10222* (2013.01)

(58) Field of Classification Search
CPC ............... G11B 20/10009; G11B 5/09; G11B 2220/90; G11B 5/012; G11B 20/1403; G11B 5/02
USPC ........... 360/24, 31, 39, 40, 46, 51, 67, 53, 54, 360/55
See application file for complete search history.

(56) References Cited

U.S. PATENT DOCUMENTS

| 7,515,369 B2 * | 4/2009 | Sugawara et al. ............... 360/51 |
| 8,767,471 B2 | 7/2014 | Chen |
| 2014/0068316 A1 | 3/2014 | Hashimoto et al. |

\* cited by examiner

*Primary Examiner* — Nabil Hindi
(74) *Attorney, Agent, or Firm* — Hamilton DeSanctis & Cha

(57) ABSTRACT

The present inventions are related to systems and methods for data processing, and more particularly to systems and methods for synchronizing operations in a data storage system.

20 Claims, 5 Drawing Sheets

SYSTEMS AND METHODS FOR TIMING CONTROL IN A DATA PROCESSING SYSTEM

FIELD OF THE INVENTION

The present inventions are related to systems and methods for data processing, and more particularly to systems and methods for synchronizing operations in a data storage system.

BACKGROUND

Various data storage systems have been developed that include pattern dependent writing where the output of a write circuit is modulated as a function of the input data pattern. Such pattern dependent writing typically involves supplying a data stream to a preamplifier circuit along with a clock or pre-determined modulation decision. The pre-amplifier then adjusts the received data to yield the desired result. In some cases, however, timing requirements are not properly met resulting in spurious outputs.

Hence, for at least the aforementioned reasons, there exists a need in the art for advanced systems and methods for synchronizing operations in a data processing system.

SUMMARY

The present inventions are related to systems and methods for data processing, and more particularly to systems and methods for synchronizing operations in a data storage system.

Various embodiments provide methods for preparing data for a storage write. The methods include: providing a synchronizing clock and a data stream from a read channel circuit to a preamplifier circuit at a first phase offset between the synchronizing clock and the data stream; changing the first phase offset to a second phase offset a first distance from the first phase offset; identifying a setup failure of a register in the preamplifier circuit corresponding to the second phase offset; changing the first phase offset to a third phase offset a second distance from the first phase offset; identifying a hold failure of a register in the preamplifier circuit corresponding to the third phase offset; calculating a default clock phase offset between the second phase offset and the third phase offset; and applying the default clock phase offset to a clock of the read channel circuit to yield the synchronizing clock of the preamplifier circuit.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment or one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1A:
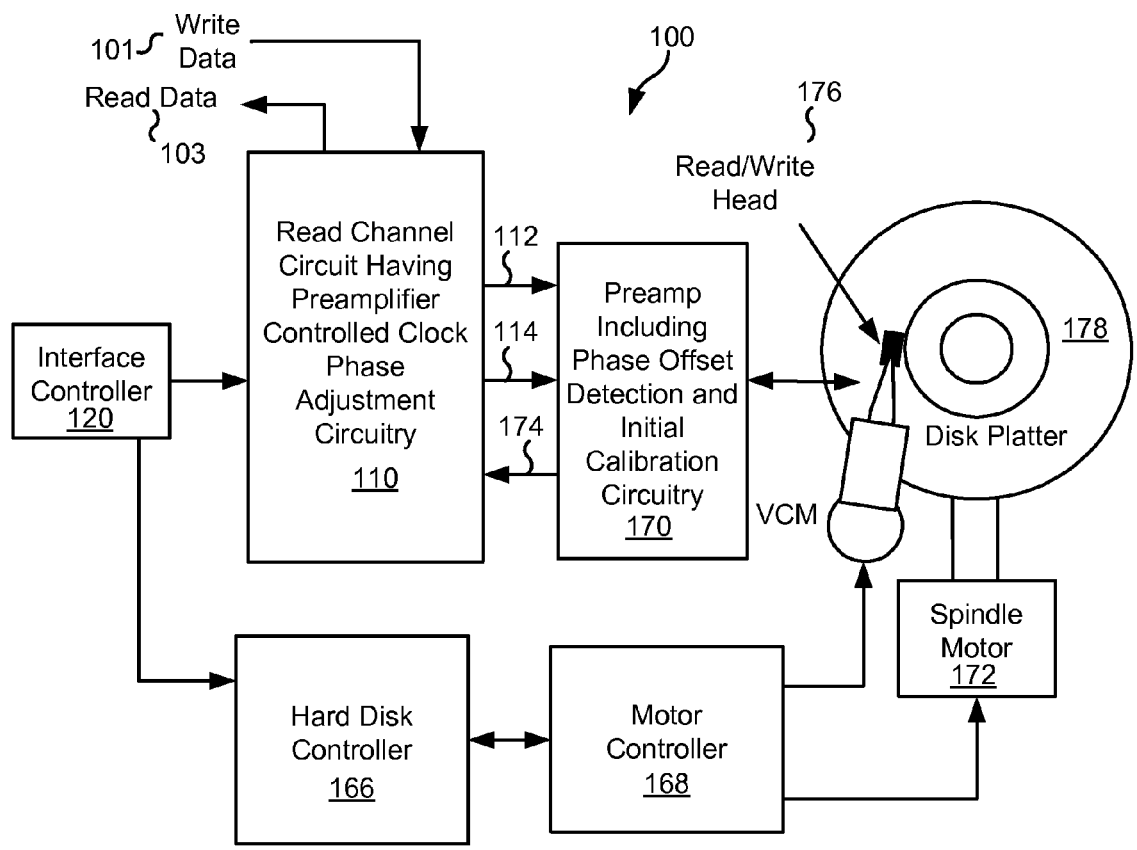
FIG. 1a shows a storage device including a read channel circuit having preamplifier controlled clock phase adjustment circuitry and a preamplifier circuit including phase offset detection and initial calibration circuitry in accordance with various embodiments of the present invention.

The present inventions are related to systems and methods for data processing, and more particularly to systems and methods for synchronizing operations in a data storage system.

Various embodiments of the present inventions provide methods for preparing data for a storage write. The methods include: providing a synchronizing clock and a data stream from a read channel circuit to a preamplifier circuit at a first phase offset between the synchronizing clock and the data stream; changing the first phase offset to a second phase offset a first distance from the first phase offset; identifying a setup failure of a register in the preamplifier circuit corresponding to the second phase offset; changing the first phase offset to a third phase offset a second distance from the first phase offset; identifying a hold failure of a register in the preamplifier circuit corresponding to the third phase offset; calculating a default clock phase offset between the second phase offset and the third phase offset; and applying the default clock phase offset to a clock of the read channel circuit to yield the synchronizing clock of the preamplifier circuit. As used herein, the phrase "synchronizing clock" or just "clock" are used interchangeably and in their broadest sense to mean a signal defining a point in time relative to another signal. Thus, for example, a synchronizing clock may be a signal applied to a clock input of a flip-flop having periodic transitions used to clock the flip flop. As another example, a synchronizing clock may be an asynchronous signal with a transition (high to low or low to high) from which a phase offset to a data signal can be measured. Based upon the disclosure provided herein, one of ordinary skill in the art will recognize a variety of synchronous clocks that may be used in relation to different embodiments of the present invention.

In some instances of the aforementioned embodiments, the methods further include: changing the second phase offset to a fourth phase offset a third distance from the first phase offset and a fourth distance from the second phase offset where the third distance is greater than the fourth distance; identifying a proper operation of the register in the preamplifier circuit corresponding to the fourth phase offset; changing the third phase offset to a fifth phase offset a fifth distance from the first phase offset and a sixth distance from the third phase offset where the fifth distance is greater than the sixth distance; and identifying a proper operation of the register in the preamplifier circuit corresponding to the fifth phase offset. In some cases, calculating the default clock phase offset between the second phase offset and the third phase offset includes calculating a center point between the fourth phase offset and the fifth phase offset. In various instances of the aforementioned embodiments, calculating a default clock phase offset is done in the read channel circuit. It should be noted that the designators "first", "second", "third", "fourth", "fifth", "sixth" and so on are used in their broadest sense to designate that one instance is different from another instance. For example, a first phase offset is different from a second phase offset. The aforementioned designators do not necessarily imply order where, for example, the fourth necessarily happens after the second, or the sixth necessarily immediately follows the fifth. In some cases, such order may occur, but it is not required.

In one or more instances of the aforementioned embodiments, changing the first phase offset to the second phase offset is done in coarse increments, and changing the first phase offset to the third phase offset is done in coarse increments. In such instances, the methods further include: changing the second phase offset to a fourth phase offset using fine increments, wherein the fourth phase offset is a third distance from the first phase offset and a fourth distance from the second phase offset, wherein the third distance is greater than the fourth distance; identifying a setup failure of the register in the preamplifier circuit corresponding to the fourth phase offset; changing the third phase offset to a fifth phase offset using fine increments where the fifth phase offset is a fifth distance from the first phase offset and a sixth distance from the third phase offset, wherein the fifth distance is greater than the sixth distance; and identifying a hold failure of the register in the preamplifier circuit corresponding to the fifth phase offset.

In some instances of the aforementioned embodiments, applying the default clock phase offset to a clock of the read channel circuit to yield the synchronizing clock of the preamplifier circuit includes applying a combination of the default clock phase offset and a data precompensation offset to the clock of the read channel to yield the synchronizing clock of the preamplifier circuit. In some cases, applying the combination of the default clock phase offset and the data precompensation offset includes adding the default clock phase offset to the data precompensation offset to yield an overall offset, and adjusting the clock of the read channel circuit relative to the data stream to reflect the overall offset.

Other embodiments provide systems for writing data to a storage medium. The systems include a read channel circuit operable to encode a data set as a first data stream, and a preamplifier circuit operable to process the first data stream for writing to a storage medium. The read channel circuit includes a phase adjustment circuit operable to: change a first phase offset between a synchronizing clock and a second data stream to a second phase offset between the synchronizing clock and the second data stream where the second phase offset is a first distance from the first phase offset; change the first phase offset to a third phase offset between the synchronizing clock and the second data stream where the third phase offset is a second distance from the first phase offset; and calculate a default clock phase offset between the second phase offset and the third phase offset. The preamplifier circuit includes a phase detect circuit operable to: indicate a setup failure of a register in the preamplifier circuit corresponding to the second phase offset as a phase indicator to the read channel circuit; and indicate a hold failure of the register in the preamplifier circuit corresponding to the third phase offset as the phase indicator to the read channel circuit.

In some instances of the aforementioned embodiments, indicating the setup failure of the register in the preamplifier circuit corresponding to the second phase offset as the phase indicator to the read channel circuit comprises clocking the data stream into a flip-flop using the synchronizing clock exhibiting the second phase offset to yield a state change in the output of the flip-flop. In various instances of the aforementioned embodiments, indicating the hold failure of the register in the preamplifier circuit corresponding to the third phase offset as the phase indicator to the read channel circuit comprises clocking the data stream into a flip-flop using the synchronizing clock exhibiting the third phase offset to yield a state change in the output of the flip-flop. In one or more instances of the aforementioned embodiments, calculating the default clock phase offset between the second phase offset and the third phase offset includes calculating a center point between the fourth phase offset and the fifth phase offset. In some cases, the setup failure is a first setup failure, the hold failure is a first hold failure, changing the first phase offset to the second phase offset is done in coarse increments, and changing the first phase offset to the third phase offset is done in coarse increments. In such cases, the phase adjustment circuit is further operable to: change the second phase offset to a fourth phase offset using fine increments, wherein the fourth phase offset is a third distance from the first phase offset and a fourth distance from the second phase offset where the third distance is greater than the fourth distance; identify a second setup failure of the register in the preamplifier circuit corresponding to the fourth phase offset; change the third phase offset to a fifth phase offset using fine increments, wherein the fifth phase offset is a fifth distance from the first phase offset and a sixth distance from the third phase offset, where the fifth distance is greater than the sixth distance; and identifying a second hold failure of the register in the preamplifier circuit corresponding to the fifth phase offset. In some instances of the aforementioned embodiments, the read channel circuit is further operable to: apply the default clock phase offset to a clock of the read channel circuit used to encode the data set as a first data stream to yield a preamplifier clock used by the preamplifier process the first data stream for writing to the storage medium. In some such instances, applying the default clock phase offset to a clock of the read channel circuit includes adding the default clock phase offset to a data precompensation offset to yield an overall offset, and adjusting the clock of the read channel circuit relative to the data stream to reflect the overall offset. In some cases, the precompensation offset is user programmable.

Yet other embodiments provide systems for writing data to a storage medium. Such systems include a read channel circuit and a preamplifier circuit. The read channel circuit is operable to: provide a data input; move a clock in phase increments relative to the data input to yield a synchronizing clock at a first phase offset and a second phase offset; identify the first phase offset as corresponding to a setup failure in a register in a preamplifier circuit; identify the second phase offset as corresponding to a hold failure in a register in a preamplifier circuit; and calculate a default clock phase offset between the first phase offset and the second phase offset. The preamplifier circuit includes a detection circuit and is operable to: detect the setup failure by applying a synchronizing clock exhibiting the first phase offset to a circuit receiving the data input; and detect the hold failure by applying the synchronizing clock exhibiting the second phase offset to the circuit receiving the data input.

In some instances of the aforementioned embodiments, the circuit receiving the data input is a flip-flop. In various instances of the aforementioned embodiment, the read channel circuit includes an averaging circuit that is operable to calculate the average between a third phase offset near the first phase offset corresponding to proper operation of the register and a fourth phase offset near the second phase offset corresponding to proper operation of the register. In one or more instances of the aforementioned embodiments, the read channel circuit includes a delay circuit. The delay circuit repeatedly moves the clock relative to the data input until the setup violation is detected, and upon identifying the setup violation the delay is stored as the first phase offset. In various instances of the aforementioned embodiments, the read channel circuit includes a delay circuit. The delay circuit repeatedly moves the clock relative to the data input until the hold violation is detected, and upon identifying the hold violation the delay is stored as the second phase offset.

Turning to FIG. 1a, a storage system 100 is shown that includes a read channel circuit 110 having preamplifier controlled clock phase adjustment circuitry and a preamplifier circuit 170 including phase offset detection and initial calibration circuitry in accordance with various embodiments invention. Storage system 100 may be, for example, a hard disk drive. Storage system 100 also includes an interface controller 120, a hard disk controller 166, a motor controller 168, a spindle motor 172, a disk platter 178, and a read/write head 176. Interface controller 120 controls addressing and timing of data to/from disk platter 178, and interacts with a host controller (not shown). The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head 176 is accurately positioned by motor controller 168 over a desired data track on disk platter 178. Motor controller 168 both positions read/write head 176 in relation to disk platter 178 and drives spindle motor 172 by moving read/write head assembly 176 to the proper data track on disk platter 178 under the direction of hard disk controller 166. Spindle motor 172 spins disk platter 178 at a determined spin rate (RPMs). Once read/write head 176 is positioned adjacent the proper data track, magnetic signals representing data on disk platter 178 are sensed by read/write head 176 as disk platter 178 is rotated by spindle motor 172. The sensed magnetic signals are provided as a continuous, minute analog signal representative of the magnetic data on disk platter 178. This minute analog signal is transferred from read/write head 176 to read channel circuit 110 via preamplifier circuit 170. Preamplifier circuit 170 is operable to amplify the minute analog signals accessed from disk platter 178. In addition, preamplifier circuit 170 applies pattern dependent writing (hereinafter "PDW") which involves modulating a write data output pattern as a function of the input data pattern. Additional information about PDW is discussed in U.S. patent application Ser. No. 14/085,816 entitled "Storage System With Pattern Dependent Write" and filed Nov. 21, 2013 by Mastrocola et al. The entirety of the aforementioned application is incorporated herein by reference for all purposes. Such PDW operates to mitigate various recording system problems including, but not limited to, transmission line reflections, magnetic writer saturation, and adjacent track interference.

In some cases, read channel circuit 110 supplies a data stream 112 (i.e., a write output) to be stored to disk platter 178 and a synchronizing clock 114. Preamplifier circuit 170 applies synchronizing clock 114 to data stream 112 as part of retiming the data stream during application of PDW processing by clocking the data stream into a register. Preamplifier circuit 170 further includes a phase error sensing and initial calibration circuit that is operable to initially identify a default clock phase offset between data stream 112 and synchronizing clock 114. In some cases, this default clock phase offset is a center point between setup and hold error points at either extreme of offsetting between data stream 112 and synchronizing clock 114. In some cases, data stream 112 is clocked into a shift register using synchronizing clock 114. As is the case with shift registers, certain relative timing requirements between synchronizing clock 114 and data stream 112 must be met otherwise setup and hold violations will occur in the shift registers of preamplifier circuit 170. The limitation due to setup and hold violations can be direct as to the maximum clock and data rates that are supported, or it can be indirect as to the maximum clock and data systematic skew (i.e., precompensation range) allowed in the system for a specific data rate. In a magnetic recording system, such precompensation range can be an adjustable parameter (in some cases user programmable) that is used to adjust for Inter Symbol Interference (ISI) induced by the magnetic components in the system. There are several system level error terms that can contribute to undesired clock and data skew that must be accounted for in the final system to maximize data rate and precompensation range. Such errors could be due to, for example: different channel manufacturers having different systematic skew at their outputs, different customers having different skew in there PCB Board or interconnect designs, and/or different manufacturing process tolerances and random variation in read channel circuit 110 and/or preamplifier circuit 170. In addition to setup and hold margin, providing a default clock phase offset spaces the edges of synchronizing clock 114 and data stream 112 increases the allowable precompensation range. Because of demagnetization fields present on disk platter 178, the physical location of certain transitions will be shifted with respect to others. In some PDW systems, this undesirable distortion is resolved by the read channel circuit precompensating the location of the clock edge by shifting it in time by some fraction of a transitional period. In both conventional and PDW recording systems the precompensation range is determined by the properties of the recording head and media. The generated default clock phase offset is provided back during a calibration phase as an offset output 174 to read channel circuit 110.

Later, during non-calibration processing, preamplifier circuit 170 provides a phase error back to read channel circuit 110 as offset output 174. During standard operation, synchronizing clock 114 is nominally aligned with data stream 112 by read channel circuit 110 according to the default clock phase offset received during the calibration operation. The phase adjustment is modified by adding the phase error to yield the synchronizing clock 114 provided to preamplifier circuit 170. Operation of the combination of read channel circuit 110 and preamplifier circuit 170 is more fully described below in relation to FIGS. 1a, 2a-2b and 3a-3b.

In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 1B:
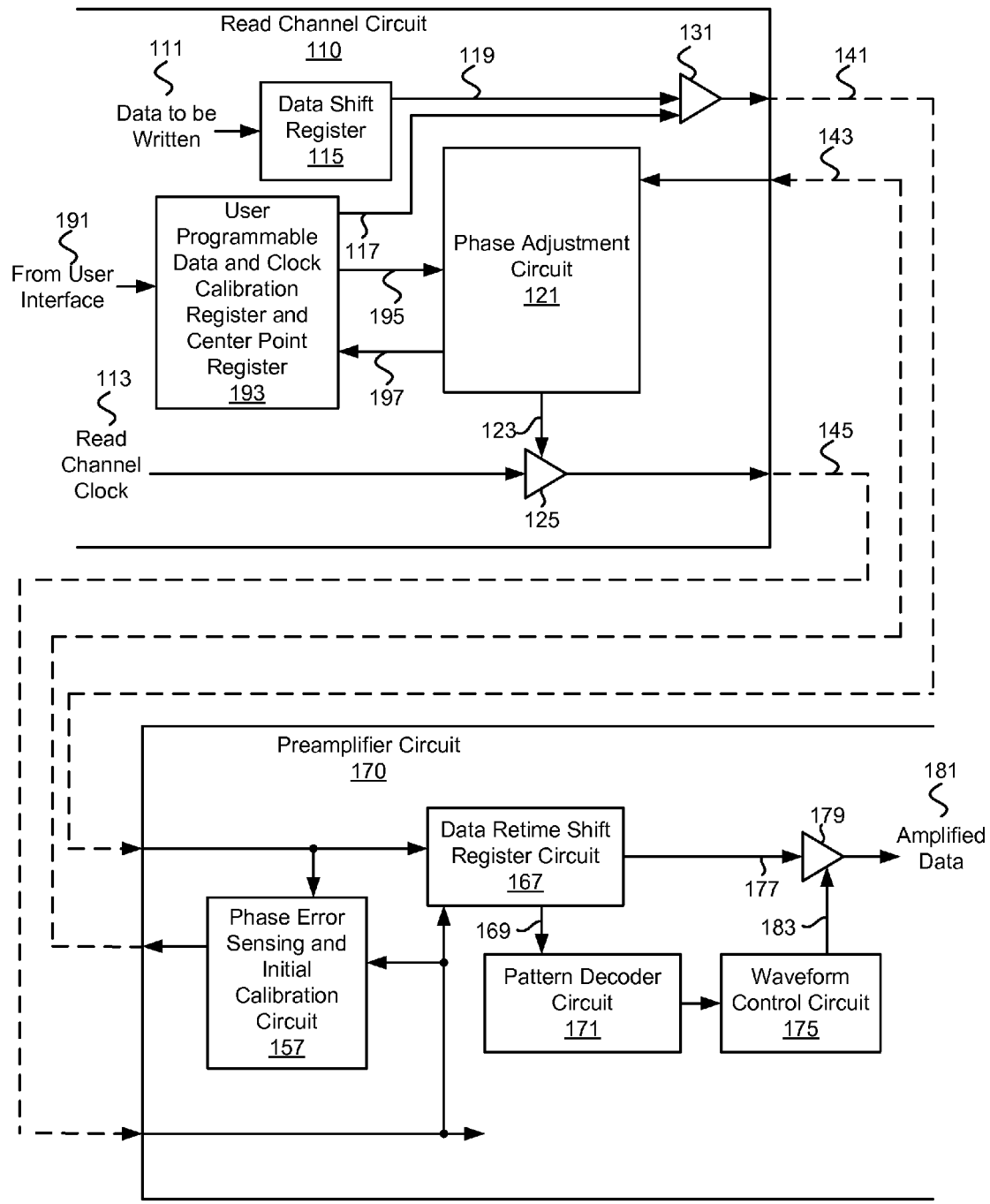
FIG. 1b depicts a portion of each of the read channel circuit and the preamplifier circuit of FIG. 1a to show the interaction between the two circuits in accordance with one or more embodiments of the present invention.

Turning to FIG. 1b, a portion of each of read channel circuit 110 and preamplifier circuit 170 of FIG. 1a is depicted to show the interaction between the two circuits in accordance with one or more embodiments invention. As shown, read channel circuit 110 includes a user programmable data and clock calibration register and center point register 193, a data shift register 115, a write buffer 131, a phase adjustment circuit 121, and a clock buffer 125. Preamplifier circuit 170 includes a phase error sensing and initial calibration circuit 157, a data retime shift register circuit 167, a pattern decoder circuit 171, a waveform control circuit 175, and a data write buffer 179.

In operation, read channel circuit 105 and preamplifier circuit 170 are switched into a calibration mode, and one of the heads of the read/write head 176 is selected for calibration. In some cases, the head that is closest to the center of a semiconductor device on which it is mounted is chosen. That said, other of the heads may be selected in accordance with different embodiments.

In the calibration mode, a user programmable data and clock calibration register and center point register circuit 193 of read channel circuit 110 is programmed via a user interface 191. This programming operates to cause read channel circuit 110 to provide a data stream 141 (shown as a dashed line indicating the transition from the device on which read channel circuit 110 is implemented to the device on which preamplifier circuit 170 is implemented) and a synchronizing clock 145 to preamplifier circuit 170 (shown as a dashed line indicating the transition from the device on which read channel circuit 110 is implemented to the device on which preamplifier circuit 170 is implemented), respectively, with defined data at a known frequency. In one particular embodiment, synchronizing clock 145 is programmed to have a one (1) Gb/s (T) frequency with approximately a fifty percent duty cycle, and data stream 141 is programmed to exhibit a constant 500 MHz tone. As such, synchronizing clock 145 can be moved over a 1T range to identify a location of setup and hold errors. In such a case, the same logic level (expected value) of data stream will be registered until the point where the transition of synchronizing clock 145 occurs near the transition of data stream 141.

User programmable data and clock calibration register and center point register circuit 193 additionally provides an initial phase offset 195 to a phase adjustment circuit 121. In some embodiments, this initial phase offset 195 is one half a period of a programmed clock frequency (T/2). In turn, phase adjustment circuit 121 provides a phase delay signal 123 to clock buffer 125 that is operable to delay a read channel clock 113 by the phase delay to yield a synchronizing clock 145 (shown as a dashed line indicating the transition from the device on which read channel circuit 110 is implemented to the device on which preamplifier circuit 170 is implemented) that leads the programmed data stream by one half of a cycle. Additionally, user programmable data and clock calibration register and center point register circuit 193 provides the programmed data stream as a data output 117 to write buffer 131 that provides it as data stream 141 (shown as a dashed line indicating the transition from the device on which read channel circuit 110 is implemented to the device on which preamplifier circuit 170 is implemented).

Data stream 141 and synchronizing clock 145 are provided to preamplifier circuit 170. Data stream 141 is received by data retime shift register 167 which registers data stream 141 using synchronizing clock 145 and provides the registered data as a data output 177 to a write buffer 179. During the calibration process, a phase error sensing and initial calibration circuit 157 registers data stream 141 using synchronizing clock 145 and provides the resulting output as a phase indicator output 143 (shown as a dashed line indicating the transition from the device on which preamplifier circuit 170 is implemented to the device on which read channel circuit 110 is implemented).

During calibration, phase adjustment circuit 121 monitors phase indicator output 143 to determine whether the output of the register in phase error sensing and initial calibration circuit 157 did not change state from an expected state. Where the output did not change from the expected state, a setup or hold violation of the register in phase error sensing and initial calibration circuit 157 has not occurred. In such a case, phase adjustment circuit 121 increments the differential delay between synchronizing clock 145 and data stream 141 by a coarse value. Such incrementing decreases the amount of time that synchronizing clock 145 leads data stream 141. This process of incrementing continues until a state change in phase indicator output 143 is identified. In one particular embodiment, the coarse value is one thirty-second of a period of synchronizing clock 145 (T/32). Based upon the disclosure provided herein, one of ordinary skill in the art will recognize other course values that may be used in relation to different embodiments.

Alternatively, where phase adjustment circuit 121 detects a change in state away from the expected state of phase indicator output 143, a setup or hold violation of the register in phase error sensing and initial calibration circuit 157 has occurred or is possible. In such a case, phase adjustment circuit 121 determines whether fine tuning is to be performed. Such fine tuning may be programmed via user interface 191. Where fine tuning is to be performed, phase adjustment circuit 121 steps the phase offset back by one step of the coarse value to where synchronizing clock 145 safely registered data stream 141, and increments the differential delay between synchronizing clock 145 and data stream 141 by a fine value. Such incrementing decreases the amount of time that synchronizing clock 145 leads data stream 141. Phase adjustment circuit 121 again monitors phase indicator output 143 to determine whether the output of the register in phase error sensing and initial calibration circuit 157 changes from the expected state to an unexpected state. Where the output did not change from the expected state, a setup or hold violation of the register in phase error sensing and initial calibration circuit 157 has not occurred. In such a case, phase adjustment circuit 121 increments the differential delay between synchronizing clock 145 and data stream 141 by the fine value. This process of incrementing continues until a state change in phase indicator output 143 is identified. In one particular embodiment, the fine value is T/128.

The offset corresponding to the identification of the change of state is stored as a first offset (i.e., a maximum amount of skew acceptable between the synchronizing clock and the data stream in a first direction). This first offset is either the number of coarse steps (e.g., nT/32) less one (i.e., the last position where no violation was indicated) from the initial point where only coarse tuning is done (i.e., [(n−1)T/32]), or the number of coarse steps (e.g., nT/32) less one plus the number of fine steps less one (e.g., [(m−1)]T/128]) from the initial point where both coarse and fine tuning are done (i.e., [(n−1)T/32]+[(m−1)T/128]). This first offset is provided to phase error sensing and initial calibration circuit 157 via an output 197. In some cases, phase error sensing and initial calibration circuit 157 may provide this first offset to a user via user interface 191.

Next, the differential delay between synchronizing clock 145 and data stream 141 is again setup to exhibit the initial offset. Again, in one embodiment, the initial differential delay is set such that the synchronizing clock leads the data stream by one half of a clock cycle (T/2). Thus, where the data rate is one (1) Gb/s, the synchronizing clock is set to lead the data stream by five hundred (500) ps. Preamplifier circuit 170 receives synchronizing clock 145 and data stream 141, and clocks the data stream into data a register on a positive edge of the synchronizing clock 145. In this configuration, the output of the register will again always be a defined state (e.g., a logic '1') until a setup or hold violation occurs or would have been possible (i.e., a violative state) which will result in a different output indicative of a possible metastable state.

Data stream 141 and synchronizing clock 145 are provided to preamplifier circuit 170. During the calibration process, phase error sensing and initial calibration circuit 157 registers data stream 157 using synchronizing clock 145 and provides the resulting output as phase indicator output 143. Phase adjustment circuit 121 monitors phase indicator output 143 to determine whether the output of the register in phase error sensing and initial calibration circuit 157 did not change state from an expected state. Where the output did not change from the expected state, a setup or hold violation of the register in phase error sensing and initial calibration circuit 157 has not occurred. In such a case, phase adjustment circuit 121 decrements (i.e., the opposite direction of the preceding process) the differential delay between synchronizing clock 145 and data stream 141 by the coarse value. Such decrementing increases the amount of time that synchronizing clock 145 leads data stream 141. This process of decrementing continues until a state change in phase indicator output 143 is identified.

Alternatively, where phase adjustment circuit 121 detects a change in state away from the expected state of phase indicator output 143, a setup or hold violation of the register in phase error sensing and initial calibration circuit 157 has occurred or is possible. In such a case, phase adjustment circuit 121 determines whether fine tuning is to be performed. Where fine tuning is to be performed, phase adjustment circuit 121 steps the phase offset back by one step of the coarse value and decrements the differential delay between synchronizing clock 145 and data stream 141 by the fine value. Such decrementing increases the amount of time that synchronizing clock 145 leads data stream 141. Phase adjustment circuit 121 again monitors phase indicator output 143 to determine whether the output of the register in phase error sensing and initial calibration circuit 157 changes from the expected state to an unexpected state. Where the output did not change from the expected state, a setup or hold violation of the register in phase error sensing and initial calibration circuit 157 has not occurred. In such a case, phase adjustment circuit 121 decrements the differential delay between synchronizing clock 145 and data stream 141 by the fine value. This process of decrementing continues until a state change in phase indicator output 143 is identified.

The offset corresponding to the identification of the change of state is stored as a second offset (i.e., a maximum amount of skew acceptable between the synchronizing clock and the data stream in a second direction). This second offset is either the negative of the number of coarse steps (e.g., nT/32) less one (i.e., the last position where no violation was indicated) from the initial point where only coarse tuning is done (i.e., −[(n−1)T/32]), or the negative of the number of coarse steps (e.g., nT/32) less one plus the number of fine steps less one (e.g., [(m−1)]T/128]) from the initial point where both coarse and fine tuning are done (i.e., −[(n−1)T/32]−[(m−1)T/128]). This second offset is provided to phase error sensing and initial calibration circuit 157 via output 197. In some cases, phase error sensing and initial calibration circuit 157 may provide this second offset to a user via user interface 191.

Using the first offset and the second offset, user programmable data and clock calibration register and center point register 193 calculates a default clock phase offset based upon the first offset and the second offset, and this default clock phase offset is stored. In one particular embodiment, the default clock phase offset is calculated by subtracting the second offset from the first offset and dividing by two. Said another way, a center point between the first offset and the second offset is calculated and provided as the clock phase offset.

During standard operation, the aforementioned default clock phase offset may be used as an unprecompensated skew between data stream 141 and synchronizing clock 145. In such a case, any precompensation is added by user programmable data and clock calibration register and center point register 193 to the default clock phase offset, and the resulting phase adjustment is provided to phase adjustment circuit 121. In turn, phase adjustment circuit 121 provides phase delay signal 123 to clock buffer 125 that is operable to delay read channel clock 113 by the phase delay to yield synchronizing clock 145. Such precompensation compensates for demagnetization fields present on a recorded media. Because of such demagnetized fields, the physical location of certain transitions will be shifted with respect to others. This results in an undesirable distortion that is resolved by precompensating the location of the clock edge by shifting it in time by some fraction of a bit period by the read channel circuit. As is known in the art, such precompensation is modified based upon the properties of the recording head and media. By determining the default clock phase offset away from a possible setup or hold violation, a possible range for the added pre-compensation factor is known and in some cases can be maximized in either or both of a positive or negative direction.

During standard operation, data stream 141 is generated by shifting data to be written 111 through a data shift register 115. Data stream 141 is registered by data retime shift register 167 synchronous to synchronizing clock 145. A register output 177 is provided to a write buffer 179 that enforces PDW according to a control signal 183 to yield amplified data 181. Control signal 183 is generated based on a registered output 169 from data retime shift register 167 using a pattern decoder circuit 171 and a waveform control circuit 175 as is known in the art.

Figure 2A:
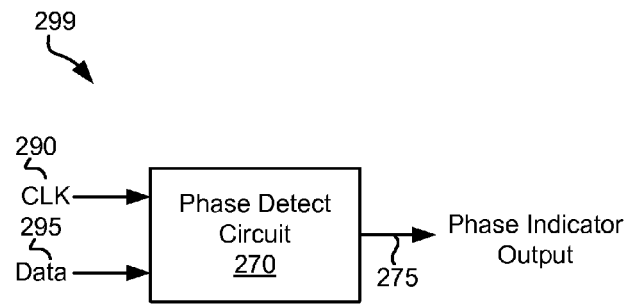
FIG. 2a shows one implementation of an initial calibration circuit implemented as part of the preamplifier circuit of FIGS. 1a-1b in accordance with one or more embodiments of the present invention.

Turning to FIG. 2a, one implementation of an initial calibration circuit 299 implemented as part of phase error sensing and initial calibration circuit 157 of preamplifier circuit 170 is shown in accordance with one or more embodiments. Initial calibration circuit 299 includes a phase detect circuit 270. In one form, phase detect circuit 270 is a single flip-flop that registers a data input 295 synchronous to a clock 290. The registered value is provided as a phase indicator output 275. Where initial calibration circuit 299 is used in relation to preamplifier circuit 170, clock 290 is connected to synchronizing clock 145, data input 295 is connected to data stream 141, and phase indicator output 275 is connected to phase indicator output 143. In some cases, the flip-flop used is one of the flip-flops included in data retime shift register circuit 167.

Figure 2B:
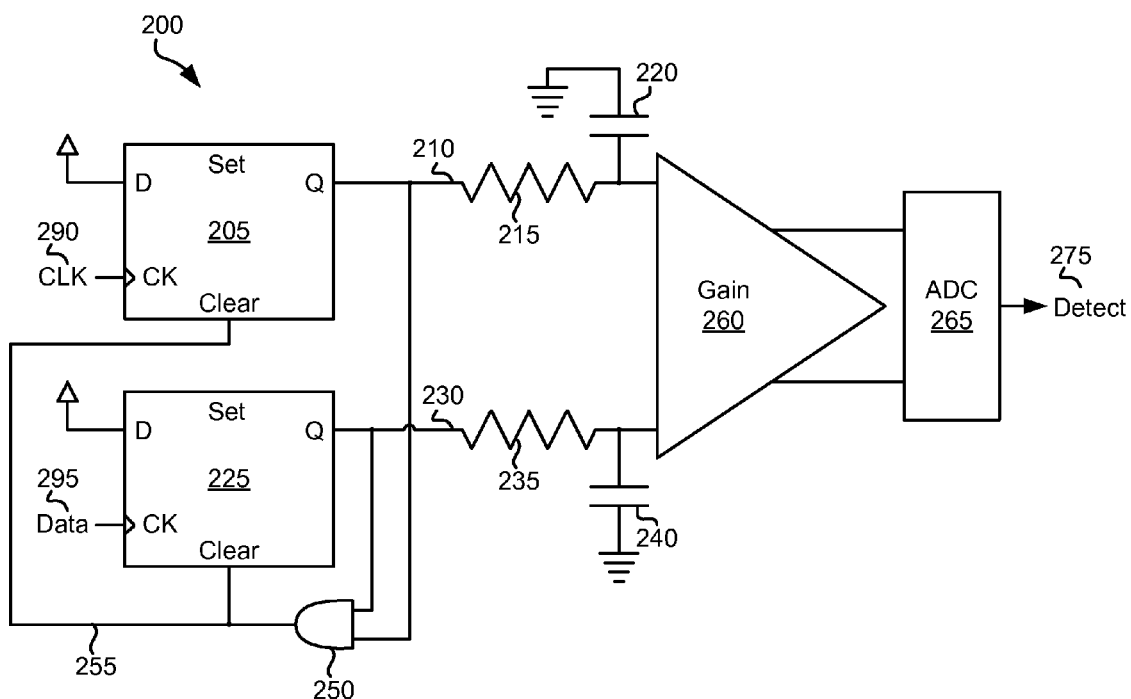
FIG. 2b shows another implementation of an initial calibration circuit implemented as part of the preamplifier circuit of FIGS. 1a-1b in accordance with one or more embodiments of the present invention.

Turning to FIG. 2b, another implementation of an initial calibration circuit 200 implemented as part of phase error sensing and initial calibration circuit 157 of preamplifier circuit 170 is shown in accordance with other embodiments. Initial calibration circuit 200 includes two flip-flops 205, 225 each with their data input (D) tied to a logic '1'. Flip-flop 205 is clocked on a positive edge of clock 290 to a logic '1', and flip-flop 205 is clocked on a positive edge of data 295 to a logic '1'. Both flip-flop 205 and flip-flop 295 are reset to a logic '0' based upon a reset signal 255 generated by an AND gate 250. Reset signal 255 is asserted when the outputs of both flip-flop 205 and flip-flop 225 are at a logic '1'.

An output 210 from flip-flop 205 is provided to an RC network including a resistor 215 and a capacitor 220. An output 230 from flip-flop 225 is provided to an RC network including a resistor 235 and a capacitor 240. In some cases, both of the RC networks exhibit a 25 ns time constant. The outputs from the aforementioned RC networks are provided to a differential amplifier 260, and in turn the output of the differential amplifier is provided to an analog to digital converter circuit 265 that generates phase indicator output 275. Where initial calibration circuit 200 is used in relation to preamplifier circuit 170, clock 290 is connected to synchronizing clock 145, data input 295 is connected to data stream 141, and phase indicator output 275 is connected to phase indicator output 143. In some cases, the flip-flops used are from the flip-flops included in data retime shift register circuit 167. The aforementioned circuit is used to find the zero phase error location so that absolute accuracy of the phase to voltage conversion is not important. Once this minimal phase error setting is found the user will then adjust the relative data verses clock delay accordingly to optimally align the two signals. Note that this is expected to be an iterative process for the user. Of note, initial calibration circuit 200 provides an analog output indicative of a phase offset that can be used in relation to some embodiments of the present invention to control the phase changes between steps that are used to determine a default phase offset.

Figure 3A:
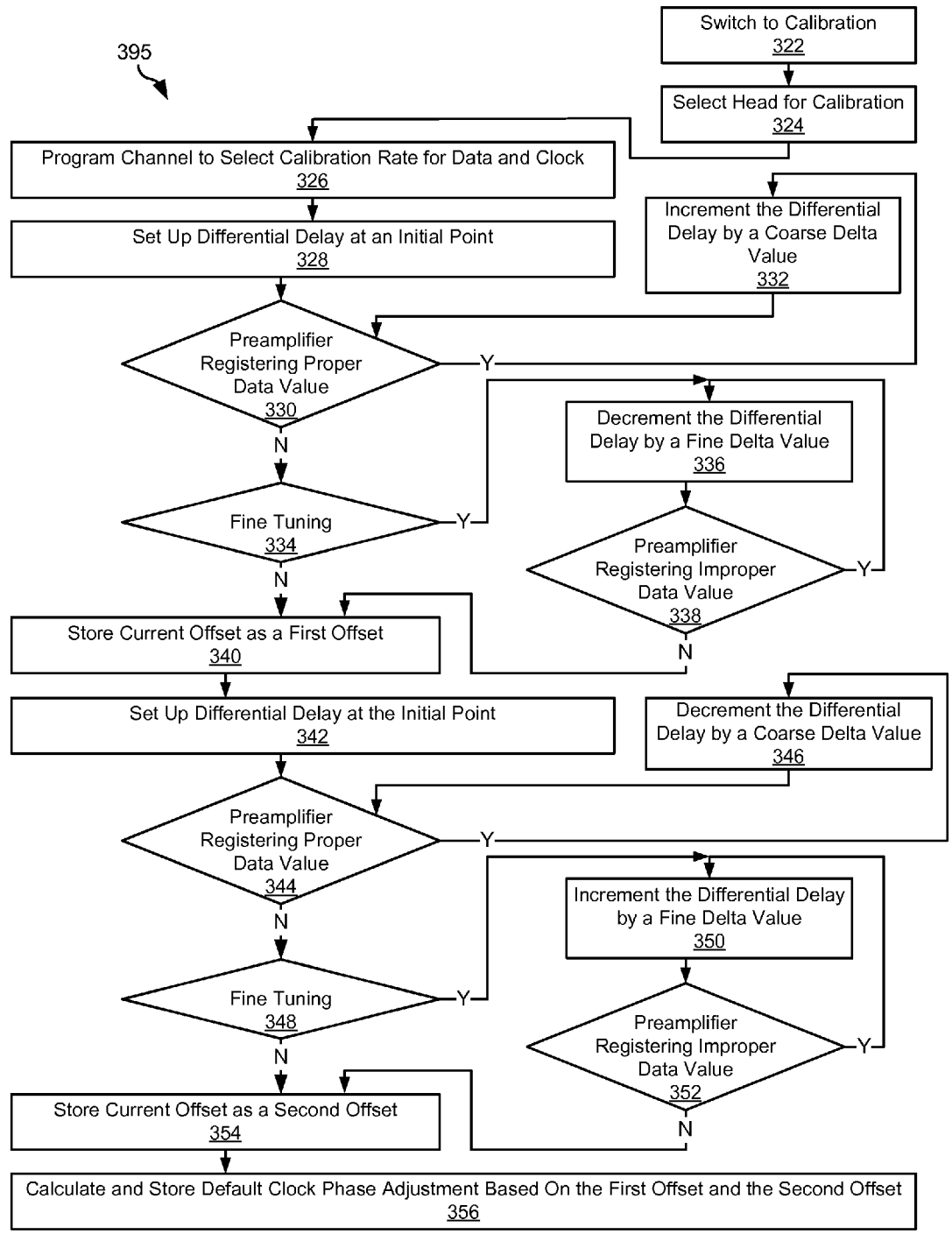
FIG. 3a is a flow diagram showing a method in accordance with various embodiments of the present invention for initial phase offset calibration.

Turning to FIG. 3a, a flow diagram 395 shows a method in accordance with various embodiments for initial phase offset calibration. Following flow diagram 395, data processing circuitry is switched to a calibration mode (block 322). The data processing circuitry includes, but is not limited to, a read channel circuit having preamplifier controlled clock phase adjustment circuitry, a preamplifier circuit including phase offset detection and initial calibration circuitry, and a read/write head assembly that includes one or more heads. One of the heads of the read/write head assembly is selected for calibration (block 324). In some cases, the head that is closest to the center of a semiconductor device on which it is mounted is chosen. That said, other of the heads may be selected in accordance with different embodiments.

In the calibration mode, the read channel circuit of the data processing circuitry is programmed to provide a defined data pattern as an output data stream along with a synchronizing clock that will be provided to the preamplifier circuit of the data processing circuitry (block 326). In one particular embodiment, the synchronizing clock is programmed to have a one (1) Gb/s frequency with approximately a fifty percent duty cycle, and the data pattern is programmed to have a one (1) Gb/s frequency with approximately a fifty percent duty cycle. In such a case, both the synchronizing clock and the data pattern will exhibit a constant 500 MHz tone.

A differential delay between the synchronizing clock and the data stream is setup to exhibit an initial offset (block 328). In one embodiment, the initial differential delay is set such that the synchronizing clock leads the data stream by one half of a clock cycle (T/2). Thus, where the data rate is one (1) Gb/s, the synchronizing clock leads the data stream by five hundred (500) ps. The preamplifier circuit receives the synchronizing clock and the data stream, and clocks the data stream into a register on a positive edge of the synchronizing clock. In this configuration, the output of the register will always be a defined state (e.g., a logic '1') until a setup or hold violation occurs which will result in a different output indicative of a possible metastable state.

It is determined whether the output of the register is the defined state (block 330). Where the output is the defined state (block 330), a setup or hold violation has not occurred and the differential delay between the synchronizing clock and the data stream is incremented by a coarse value (block 332). Such incrementing decreases the amount of time that the synchronizing clock leads the data stream. In one particular embodiment, the coarse value is one thirty-second of a period of the synchronizing clock (T/32). Based upon the disclosure provided herein, one of ordinary skill in the art will recognize other course values that may be used in relation to different embodiments.

Alternatively, where it is determined that the output of the register is not the defined state (block 330), a setup or hold violation has occurred. In this condition, it is determined whether fine tuning is to be performed (block 334). Where fine tuning is to be performed (block 334), the differential delay between the synchronizing clock and the data stream is decremented by a fine value (block 336). Such decrementing (i.e., in the opposite direction as block 332) increases the amount of time that the synchronizing clock leads the data stream. In one particular embodiment, the fine value is (T/128). Based upon the disclosure provided herein, one of ordinary skill in the art will recognize other fine values that may be used in relation to different embodiments. It is determined whether the output of the register is not the defined state (block 338). Where it is determined that the output of the register is still registering an improper data value (i.e., other than the defined state) (block 338), a setup and hold violation remains and the processes of blocks 336, 338 are repeated. Alternatively, where it is determined that the output of the register is at the defined state (block 338), the setup or hold violation has been resolved.

The offset corresponding to the identification of the change of state (from either block 330 where no fine tuning is selected or from block 338 where fine tuning is selected), is stored as a first offset (i.e., a maximum amount of skew acceptable between the synchronizing clock and the data stream in a first direction) (block 340). This first offset is either the number of coarse steps (e.g., nT/32) less one (i.e., the last position where no violation was indicated) from the initial point where only coarse tuning is done (i.e., [(n−1)T/32]), or the number of coarse steps (e.g., nT/32) less one plus the total number of possible fine steps less the actual number of fine steps (e.g., [(128−m)T/128]) from the initial point where both coarse and fine tuning are done (i.e., [(n−1)T/32]+[(128−m)T/128]). This first offset may be reported to a user. It should be noted that in other embodiments where a change in the register output is noted during coarse tuning that the prior coarse tuning offset may be re-applied (i.e., the coarse tuning is backed off to yield the prior non-violative state), and in such cases the fine tuning would be moved in the same direction as the coarse tuning. Where such is the case, the first offset would be either the number of coarse steps (nT/32) (i.e., the last position where no violation was indicated) from the initial point where only coarse tuning is done, or the number of coarse steps (nT/32) plus the number of fine steps (mT/128) from the initial point where both coarse and fine tuning are done (i.e., [nT/32]+[(mT/128]).

Next, the differential delay between the synchronizing clock and the data stream is again setup to exhibit the initial offset (block 342). Again, in one embodiment, the initial differential delay is set such that the synchronizing clock leads the data stream by one half of a clock cycle (T/2). Thus, where the data rate is one (1) Gb/s, the synchronizing clock leads the data stream by five hundred (500) ps. The preamplifier circuit receives the synchronizing clock and the data stream, and clocks the data stream into a register on a positive edge of the synchronizing clock. In this configuration, the output of the register will again always be a defined state (e.g., a logic '1') until a setup or hold violation occurs (i.e., a violative state) which will result in a different output indicative of a metastable state.

It is determined whether the output of the register is the defined state (block 344). Where the output is the defined state (block 344), a setup or hold violation has not occurred and the differential delay between the synchronizing clock and the data stream is decremented (i.e., moved in the opposite direction as block 332) by the coarse value (block 346). Such decrementing increases the amount of time that the synchronizing clock leads the data stream.

Alternatively, where it is determined that the output of the register is not the defined state (block 344), a setup or hold violation has occurred. In this condition, it is determined whether fine tuning is to be performed (block 348). Where fine tuning is to be performed (block 348), the differential delay between the synchronizing clock and the data stream is incremented (i.e., in the opposite direction as block 346) by the fine value (block 350). Such incrementing decreases the amount of time that the synchronizing clock leads the data stream. It is determined whether the output of the register is not the defined state (block 352). Where it is determined that the output of the register is still registering an improper data value (i.e., other than the defined state) (block 352), a setup and hold violation remains and the processes of blocks 350, 352 are repeated. Alternatively, where it is determined that the output of the register is at the defined state (block 352), the setup or hold violation has been resolved.

The offset corresponding to the identification of the change of state (from either block 344 where no fine tuning is selected or from block 352 where fine tuning is selected), is stored as a second offset (i.e., a maximum amount of skew acceptable between the synchronizing clock and the data stream in a second direction) (block 354). This second offset is either a negative of number of coarse steps (e.g., nT/32) less one (i.e., the last position where no violation was indicated) from the initial point where only coarse tuning is done (i.e., −[(n−1)T/32]), or a negative of the number of the coarse steps (e.g., nT/32) less one plus the total number of possible fine steps less the actual number of fine steps (e.g., −[(128−m)T/128]) from the initial point where both coarse and fine tuning are done (i.e., −[(n−1)T/32]−[(128−m)T/128]). This second offset may also be reported to the user. It should be noted that in other embodiments where a change in the register output is noted during coarse tuning that the prior coarse tuning offset may be re-applied (i.e., the coarse tuning is backed off to yield the prior non-violative state), and in such cases the fine tuning would be moved in the same direction as the coarse tuning. Where such is the case, the first offset would be either the negative of the number of coarse steps (−nT/32) (i.e., the last position where no violation was indicated) from the initial point where only coarse tuning is done, or the negative of the number of coarse steps (nT/32) plus the number of fine steps (mT/128) from the initial point where both coarse and fine tuning are done (i.e., −[nT/32]−[(mT/128]).

A default clock phase offset is calculated based upon the first offset and the second offset, and this default clock phase offset is stored to the read channel circuit (block 356). In one particular embodiment, the default clock phase offset is calculated by subtracting the second offset from the first offset and dividing by two. This subtraction may be performed by a user, in the read channel circuit, or in the preamplifier circuit depending upon the implementation. Said another way, a center point between the first offset and the second offset is calculated and provided as the clock phase offset. The calculated default clock phase offset may be used as an unprecompensated skew between the data stream and the synchronizing clock. The read channel circuit can then apply precompensation by adding an additional positive or negative offset from the default clock phase offset to yield a precompensated output. Such precompensation compensates for demagnetization fields present on a recorded media. Because of such demagnetized fields, the physical location of certain transitions will be shifted with respect to others. This results in an undesirable distortion that is resolved by precompensating the location of the clock edge by shifting it in time by some fraction of a bit period by the read channel circuit. As is known in the art, such precompensation is modified based upon the properties of the recording head and media. By determining the default clock phase offset, a possible range for the added pre-compensation factor is known and in some cases can be maximized in either or both of a positive or negative direction. In some cases, the processes of flow diagram 395 are repeated using different environmental and/or clock frequencies to yield an array of default clock phase offsets that would be used depending upon which combination of environmental and/or cock frequency condition is detected.

Figure 3B:
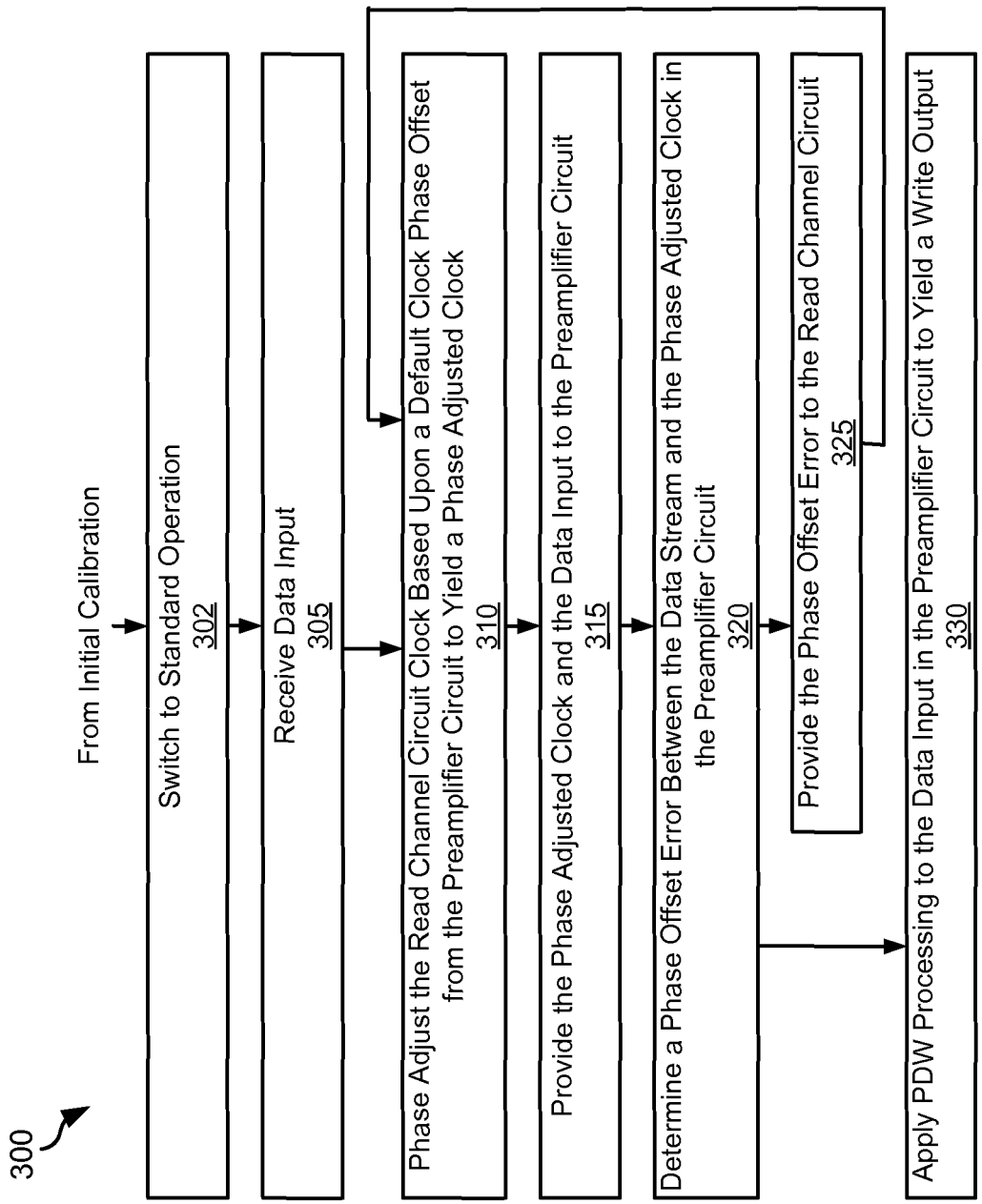
FIG. 3b is a flow diagram showing a method in accordance with some embodiments of the present invention for data processing using the result of the aforementioned initial phase offset calibration.

Turning to FIG. 3b, a timing diagram 300 shows a method in accordance with some embodiments for data processing using the aforementioned default clock phase offset. Following flow diagram 300, the default clock phase offset is received from the calibration operation, and the data processing circuit is switched to a standard processing operational mode (block 302). Data is received that is to be written to a storage medium via a combination of the and the read channel circuit and the preamplifier circuit (block 305).

The read channel circuit adjusts the phase of the synchronizing clock relative to the data stream to yield a phase adjusted clock (block 310). Initially, the phase adjusted clock is the synchronizing clock with the phase modified according to the default clock phase offset. In some cases, the phase adjusted clock is further modified to include a precompensation offset. As the circuit is operated, phase adjustments are fed back from the preamplifier circuit which are also added to yield the phase adjusted clock. This phase adjustment is added to the default clock phase offset and may be generated similar to that discussed in U.S. patent application Ser. No. 14/085,816 entitled "Storage System With Pattern Dependent Write" and filed Nov. 21, 2013 by Mastrocola et al. which was previously incorporated herein by reference for all purposes.

The resulting phase adjusted clock is provided as a synchronizing clock along with the data stream to the preamplifier circuit (block 315). A phase offset error between the data stream and the phase adjusted clock is determined in the preamplifier circuit (block 320), and is provided as a feedback signal to the read channel circuit (block 325) where it is incorporated with the default clock phase offset in yielding and updated phase adjusted clock (block 310). PDW and/or other data processing is performed by the preamplifier circuit using the phase adjusted clock (block 330).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/ or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for preparing data for a storage write, the method comprising:
   providing a synchronizing clock and a data stream from a read channel circuit to a preamplifier circuit at a first phase offset between the synchronizing clock and the data stream;
   changing the first phase offset to a second phase offset a first distance from the first phase offset;
   identifying a possible setup failure of a register in the preamplifier circuit corresponding to the second phase offset;
   changing to a third phase offset a second distance from the first phase offset;
   identifying a possible hold failure of the register in the preamplifier circuit corresponding to the third phase offset;
   calculating a default clock phase offset between the second phase offset and the third phase offset; and
   applying the default clock phase offset to a clock of the read channel circuit to yield the synchronizing clock of the preamplifier circuit.

2. The method of claim 1, the method further comprising:
   changing to a fourth phase offset a third distance from the first phase offset and a fourth distance from the second phase offset, wherein the third distance is greater than the fourth distance;
   identifying a proper operation of the register in the preamplifier circuit corresponding to the fourth phase offset;
   changing to a fifth phase offset a fifth distance from the first phase offset and a sixth distance from the third phase offset, wherein the fifth distance is greater than the sixth distance; and
   identifying a proper operation of the register in the preamplifier circuit corresponding to the fifth phase offset.

3. The method of claim 2, wherein calculating the default clock phase offset between the second phase offset and the third phase offset includes calculating a center point between the fourth phase offset and the fifth phase offset.

4. The method of claim 1, wherein changing the first phase offset to the second phase offset is done in coarse increments, wherein changing the first phase offset to the third phase offset is done in coarse increments, and wherein the method further comprises:
   changing the second phase offset to a fourth phase offset using fine increments, wherein the fourth phase offset is a third distance from the first phase offset and a fourth distance from the second phase offset, wherein the third distance is greater than the fourth distance;

identifying a possible setup failure of the register in the preamplifier circuit corresponding to the fourth phase offset;

changing the third phase offset to a fifth phase offset using fine increments, wherein the fifth phase offset is a fifth distance from the first phase offset and a sixth distance from the third phase offset, wherein the fifth distance is greater than the sixth distance; and identifying a possible hold failure of the register in the preamplifier circuit corresponding to the fifth phase offset.

5. The method of claim 1, wherein calculating a default clock phase offset is done in the read channel circuit.

6. The method of claim 1, wherein applying the default clock phase offset to a clock of the read channel circuit to yield the synchronizing clock of the preamplifier circuit comprises:

applying a combination of the default clock phase offset and a data precompensation offset to the clock of the read channel to yield the synchronizing clock of the preamplifier circuit.

7. The method of claim 6, wherein applying the combination of the default clock phase offset and the data precompensation offset includes adding the default clock phase offset to the data precompensation offset to yield an overall offset, and adjusting the clock of the read channel circuit relative to the data stream to reflect the overall offset.

8. A system for writing data to a storage medium, the system comprising:

a read channel circuit operable to encode a data set as a first data stream;

a preamplifier circuit operable to process the first data stream for writing to a storage medium;

wherein the read channel circuit includes a phase adjustment circuit operable to:

change a first phase offset between a synchronizing clock and a second data stream to a second phase offset between the synchronizing clock and the second data stream, wherein the second phase offset is a first distance from the first phase offset;

change to a third phase offset between the synchronizing clock and the second data stream, wherein the third phase offset is a second distance from the first phase offset;

calculate a default clock phase offset between the second phase offset and the third phase offset;

wherein the preamplifier circuit includes a phase detect circuit operable to:

indicate a possible setup failure of a register in the preamplifier circuit corresponding to the second phase offset as a phase indicator to the read channel circuit; and indicate a possible hold failure of the register in the preamplifier circuit corresponding to the third phase offset as the phase indicator to the read channel circuit.

9. The system of claim 8, wherein indicating the possible setup failure of the register in the preamplifier circuit corresponding to the second phase offset as the phase indicator to the read channel circuit comprises clocking the data stream into a flip-flop using the synchronizing clock exhibiting the second phase offset to yield a state change in the output of the flip-flop.

10. The system of claim 8, wherein indicating the possible hold failure of the register in the preamplifier circuit corresponding to the third phase offset as the phase indicator to the read channel circuit comprises clocking the data stream into a flip-flop using the synchronizing clock exhibiting the third phase offset to yield a state change in the output of the flip-flop.

11. The system of claim 8, wherein calculating the default clock phase offset between the second phase offset and the third phase offset includes calculating a center point between the fourth phase offset and the fifth phase offset.

12. The system of claim 11, wherein the possible setup failure is a first possible setup failure, wherein the possible hold failure is a first hold failure, wherein changing the first phase offset to the second phase offset is done in coarse increments, wherein changing the first phase offset to the third phase offset is done in coarse increments, and wherein the phase adjustment circuit is further operable to:

change the second phase offset to a fourth phase offset using fine increments, wherein the fourth phase offset is a third distance from the first phase offset and a fourth distance from the second phase offset, wherein the third distance is greater than the fourth distance;

identify a second possible setup failure of the register in the preamplifier circuit corresponding to the fourth phase offset;

change the third phase offset to a fifth phase offset using fine increments, wherein the fifth phase offset is a fifth distance from the first phase offset and a sixth distance from the third phase offset, wherein the fifth distance is greater than the sixth distance; and identifying a second possible hold failure of the register in the preamplifier circuit corresponding to the fifth phase offset.

13. The system of claim 8, wherein the read channel circuit is further operable to:

apply the default clock phase offset to a clock of the read channel circuit used to encode the data set as a first data stream to yield a preamplifier clock used by the preamplifier process the first data stream for writing to the storage medium.

14. The system of claim 13, wherein applying the default clock phase offset to a clock of the read channel circuit includes adding the default clock phase offset to a data precompensation offset to yield an overall offset, and adjusting the clock of the read channel circuit relative to the data stream to reflect the overall offset.

15. The system of claim 14, wherein the precompensation offset is user programmable.

16. A system for writing data to a storage medium, the system comprising:

a read channel circuit operable to:
provide a data input;
move a clock in phase increments relative to the data input to yield a synchronizing clock at a first phase offset and a second phase offset;
identify the first phase offset as corresponding to a possible setup failure in a register in a preamplifier circuit;
identify the second phase offset as corresponding to a possible hold failure in a register in a preamplifier circuit; and
calculate a default clock phase offset between the first phase offset and the second phase offset; and the preamplifier circuit including a detection circuit and operable to:
detect the possible setup failure by applying a synchronizing clock exhibiting the first phase offset to a circuit receiving the data input; and detect the possible hold failure by applying the synchronizing clock exhibiting the second phase offset to the circuit receiving the data input.

17. The system of claim 16, wherein the circuit receiving the data input is a flip-flop.

18. The system of claim 16, wherein the read channel circuit includes an averaging circuit that is operable to calculate the average between a third phase offset near the first phase offset corresponding to proper operation of the register and a fourth phase offset near the second phase offset corresponding to proper operation of the register.

19. The system of claim 16, wherein the read channel circuit includes a delay circuit, and wherein the delay circuit repeatedly moves the clock relative to the data input until the possible setup violation is detected, and upon identifying the possible setup violation the delay is stored as the first phase offset.

20. The system of claim 16, wherein the read channel circuit includes a delay circuit, and wherein the delay circuit repeatedly moves the clock relative to the data input until the possible hold violation is detected, and upon identifying the possible hold violation the delay is stored as the second phase offset.

\* \* \* \* \*